US012769704B2

(12) United States Patent
Zaman

(10) Patent No.: US 12,769,704 B2
(45) Date of Patent: Oct. 20, 2026

(54) AUTOMATIC FOLDER CATEGORIZATION OF DOCUMENTS BASED ON EMBEDDED BRAND LOGO METHODS

(71) Applicant: KYOCERA DOCUMENT SOLUTIONS, INC., Osaka (JP)

(72) Inventor: Selim Zaman, San Mateo, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/929,084

(22) Filed: Oct. 28, 2024

(65) Prior Publication Data

US 2026/0119451 A1 Apr. 30, 2026

(51) Int. Cl.
*G06F 16/00* (2019.01)
*G06F 16/13* (2019.01)
*G06F 16/16* (2019.01)

(52) U.S. Cl.
CPC .............. *G06F 16/16* (2019.01); *G06F 16/13* (2019.01)

(58) Field of Classification Search
None
See application file for complete search history.

(56) References Cited

U.S. PATENT DOCUMENTS 6,278,795 B1 * 8/2001 Anderson .............. G07D 11/50 382/135
8,438,163 B1 * 5/2013 Li ......................... G06F 16/583 707/706
11,514,337 B1 * 11/2022 Karpman ................ G06F 16/51
2004/0071453 A1 * 4/2004 Valderas .............. G11B 27/105 386/E5.064
2013/0176594 A1 * 7/2013 Tanaka ............... H04N 1/00244 358/1.15
2014/0298380 A1 * 10/2014 Venkataswamy .... H04N 21/235 725/32
2015/0356639 A1 * 12/2015 Sobhani ............. G06Q 30/0635 705/39
2017/0118526 A1 * 4/2017 Tanji .................... H04N 21/812
2017/0134608 A1 * 5/2017 Hayano .............. H04N 1/00228
2018/0033064 A1 * 2/2018 Varley ...................... G06F 16/54
2020/0302510 A1 * 9/2020 Chachek ................ G06V 20/52
2020/0366959 A1 * 11/2020 Pau .................. H04N 21/45455
(Continued)

FOREIGN PATENT DOCUMENTS

WO WO-2021072998 A1 * 4/2021 ........... G06V 40/168

*Primary Examiner* — Hasanul Mobin
(74) *Attorney, Agent, or Firm* — Millen, White, Zelano & Branigan P.C.; William F. Nixon

(57) ABSTRACT

A document categorization method of a document management system receives a plurality of documents imported. The method detects at least one brand logo in a document of a plurality of documents and compare the detected at least one brand logo and a brand logo lookup table to find a brand logo information of a corresponding brand logo. The method adds the brand logo information to a document metadata of the document for folder categorization. The method sends the document to destination folder based on the document class of the document metadata and creates a subfolder for placing the document in the destination folder based on the brand logo information of the document metadata. The method also removes a brand logo within a document to reduce the data size to create additional capacity in the document management system.

20 Claims, 6 Drawing Sheets

(56) References Cited

U.S. PATENT DOCUMENTS

| | | | | |
|---|---|---|---|---|
| 2021/0136450 | A1* | 5/2021 | Kim | H04N 21/42684 |
| 2022/0164262 | A1* | 5/2022 | Vainikka | G06F 11/1433 |
| 2025/0061689 | A1* | 2/2025 | Robinson | G06V 10/764 |

* cited by examiner

AUTOMATIC FOLDER CATEGORIZATION OF DOCUMENTS BASED ON EMBEDDED BRAND LOGO METHODS

FIELD OF THE INVENTION

The present invention relates to automatically categorizing document methods based on embedded brand logo reflecting document origin. More particularly, the present invention relates to categorizing documents by metadata of documents for initial categorization and by detected brand logos for further document categorization and storing documents in subfolders.

DESCRIPTION OF THE RELATED ART

A document management system may import documents in bulk into the document management system. After importing documents, users manually organize their folder structures, such as creating company-specific folders and placing relevant documents therein.

When a large number of documents are uploaded to the document management system, downstream processing of the documents becomes cumbersome or error-prone due to variety of brand logos or brand companies between the various documents. Further, slight variations of brand logos may cause confusion to the user while categorizing the documents manually to the document management system. While categorizing documents to a designated folder, the folder may not have enough capacity to save the document and may cause confusion to the user in categorizing the documents manually to the document management system.

SUMMARY OF THE INVENTION

A method for automatically categorizing a document to a folder is disclosed. The method includes detecting at least one brand logo in a document of a plurality of documents. The method also includes comparing the detected at least one brand logo and a brand logo lookup table to find a brand logo information of a corresponding brand logo. The method also includes adding the brand logo information to a document metadata of the document for folder categorization. The method also includes sending the document to a destination folder based on a document class of the document metadata. The method also includes creating a subfolder for placing the document by the brand logo information of the document metadata in the destination folder. The method also includes storing the document in the subfolder for corresponding brand logo information of the document metadata.

A method for automatically categorizing a document to a folder is disclosed. The method includes detecting a plurality of brand logos in a document of a plurality of documents. The method also includes comparing the detected plurality of brand logos and a brand logo lookup table to find a brand logo information of each brand logo of the plurality of brand logos. The brand logo information contains such as company name, business name, entity name and brand name. The lookup table contains such as company name, business name, entity name and brand name. The method also includes adding the brand logo information of each brand logo to a document metadata of the document for folder categorization. The method also includes sending the document to a destination folder based on a document class of the document metadata. The method also includes creating a plurality of subfolders for placing the document by the brand logo information of each brand logo of the document metadata in the destination folder. The method also includes storing the document in the plurality of subfolders for the corresponding brand logo information of each brand logo of document metadata.

A method for redesigning data size of a document for storage in a document management system is disclosed. The method includes determining a capacity of a destination folder within the document management system. The method also includes comparing the capacity of the destination folder against a folder capacity threshold. The method also includes removing a brand logo within a document assigned to the destination folder based on the comparison, wherein the brand logo matches a brand logo in a brand logo lookup table for the document management system. The method also includes storing the document to the destination folder. The method also includes storing the brand logo in a separate folder for restoring the document.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
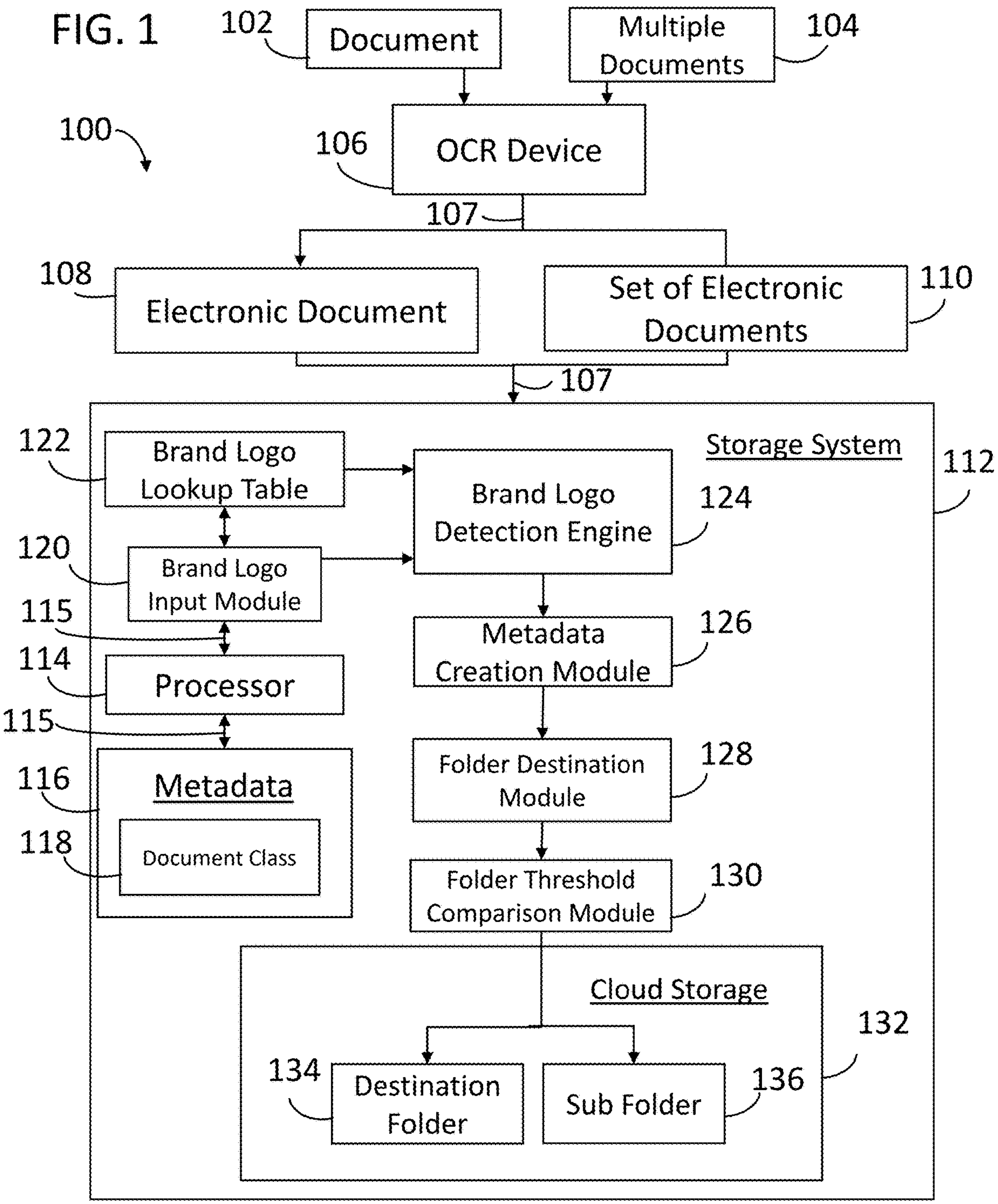
FIG. 1 illustrates a block diagram of a document management system according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a mechanism to efficiently categorize documents in a cloud storage of the document management system, such as during bulk import when a new user is migrating from. The disclosed embodiments also provide a method of removing a brand logo within a document to reduce the data size to create additional capacity in the destination folder.

New users of document management system often have to import documents in bulk into the system. After importing documents, the users have to manually organize their folder structures. The disclosed embodiments add a mechanism to further categorize documents within a folder based on brand logo. For a large folder, this feature automates the process the user would have to otherwise perform manually to create company specific folders and place relevant documents therein. The disclosed embodiments save few seconds of manual process during a document upload. The time saved scales up during bulk upload 100 documents which provides a business value proposition for document management system.

When bulk documents are uploaded to the document management system, each document has assigned metadata including a document class information, such as invoices, address lists, price lists or another types of document class. The document management system also has a brand logo lookup table to find brand logo information of a corresponding brand logo. The look up table contains the pre-recorded brand logo list for document categorization including brand logos and brand logo information such as corresponding company name, business name, entity name and brand name. The document class of metadata of documents are used for initial categorization into folders. Then, the brand logo information are used for categorization into sub-folders. The system can be modified for revamping existing folder structures as well.

The disclosed embodiments help organize folders by categorizing documents according to their origin as determined by brand logo. The document management system detects if a document has one or more embedded brand logos. The disclosed embodiments can also compare the detected plurality of brand logos and a brand logo lookup table to find a brand logo information of each brand logo of the plurality of brand logos. If multiple brands exist in a document, create a sub-folder for each. The system automatically repeats brand detection and the folder allocation process per document during bulk upload to save time compared with the user's manual categorization. Also, the system prompts users for assistance with any ambiguity during brand detection and folder creation. Utilization of brand logo detection technology to categorize documents to aid to access documents in large folders.

The disclosed embodiment can also create a new folder or find existing folder that corresponds to the bland logo information for the frequently occurring brand logo in the documents. If multiple logos appear the same number of times, create a folder or find existing folder for each company name and place a copy of the document in each folder.

The disclosed embodiment can also count the number of appearance of the logo and determining the most appeared logo and creating subfolder for the logo by looking up in the look up table when a plurality of brand logos are detected in a document.

The disclosed embodiments can also be used to update existing folders once they exceed the threshold of the destination folder. The document management system checks the destination folder size. If the documents to be saved have a larger size above a configurable threshold, then the system create sub-folders for each brand if not already existing. If an existing sub-folder size goes below than a configurable threshold due to deletions or manual movements, then the disclosed embodiments remove sub-folders putting documents back into parent folder.

FIG. 1 depicts a block diagram of a document management system 100 according to the disclosed embodiments. Document management 100 may receive large batches of documents, processing them, and manage their access and use in operations. As part of this, document management system 100 uses a storage system 112 that stores documents that have been received and processed within system 100. One feature of the processing may be scanning or importing batches of documents by optical character recognition (OCR) device 106.

OCR device 106 is communicatively coupled to storage system 112 within system 100. OCR device 106 may be connected to storage system 112 over a network 107. OCR device 106 may be within a printing device, a scanner, a computing device, a Web Client and the like. OCR device 106 is disclosed in greater detail below by FIG. 2. Within system 100, OCR device 106 helps with the importation of large batches of documents, such as records, books/texts, forms, or other data that is in a document that is captured electronically to be managed using storage system 112.

For example, document 102 may be commercial record dating back to 1984. Many of these records are on paper and with different logos. OCR device 106 captures images of the records to generate electronic documents 108. An electronic document 108 is the electronic or image version of document 102. Electronic document 108 may include images having pixels to represent the characters and graphics within first set of documents 102. OCR device 106 imports the document 102 into system 100 by processing them.

Using the above example, multiple documents 104 also may be imported into system 100 using OCR device 106. Multiple documents 104 may be company records kept on paper for the past several years. These records also may include different formats and even different languages. OCR device 106 captures multiple documents 104 to generate a set of electronic documents 110. Set of electronic documents 110 also may include images having pixels that represent the characters and graphics within multiple documents 104.

Document 102 and multiple documents 104 include logo fields wherein logos are provided for the document itself or some text or graphic within the documents. The logo fields are not necessarily in the same place within each document. Further, the format used for the logo field may vary. The characters used in the logo fields also may be used different color or size.

Document 102 is provided to storage system 112. Storage system 112 performs pre-processing of the documents before storing them within a document module. Storage system 112, however, includes a processor 114 that executes instructions to configure the storage system to perform specified functions. Processor 114 is connected to metadata storage 116 by data bus 115. Metadata storage 116 includes document class information, such as invoices, address lists, price lists or another types of document class 118. Document class 118 may be a code that, when read by processor 114, configures storage system 112 to perform the operations disclosed herein.

Processor 114 also may be coupled to brand logo input module 120 for storage system 112. Electronic documents may be imported from OCR device 106 at brand logo input module 120 over network 107. In some embodiments, storage system 112 and OCR device 106 may be in the same device such that network 107 and brand logo input module 120 are not used. Upon receipt of the electronic documents, processor 114 executes document class 118 to configure storage system 112 to perform the pre-processing operations.

These operations may include processing an electronic document, such as electronic document 108, using a brand logo lookup table 122. Brand logo lookup table 122 analyzes one or more logos within electronic document 108 to determine if the logo on a document match with pre-recorded logo information. Brand logo detection engine 124 identifies the portion of the document and indicates that it is a possible logo. The identified fields may be highlighted or identified within the electronic documents of electronic document 108.

Electronic document 108 is analyzed by brand logo detection engine 124 after importation into storage system 112. In some embodiments, brand logo detection engine 124 may receive electronic document 108 after they have been reviewed and processed by brand logo lookup table 122. Brand logo detection engine 124 detects one or more logo within one or more documents of electronic document 108. Not every document will have a logo. Further, brand logo detection engine 124 determines a format for the logo within the logo field, as shown in the examples above.

Metadata creation module 126 receives electronic document 108 after the logo fields having logos are identified. Metadata creation module 126 determines whether the logos in each logo field matches brand logo lookup table 122. This table may be specified by a user, an administrator, company or organizational policy, and the like. Metadata creation module 126 adjusts or modifies the metadata within the logo field if they do not match the pre-set metadata. Based on document category in the metadata of the document, folder destination module 128 organizes the document and determines the destination folder. Folder threshold comparison module detects whether the destination folder 134 has sufficient capacity to save documents.

This adjustment results in a modified electronic document and an original electronic document within storage system 112. Both sets of electronic documents are stored within storage system 112. Thus, electronic document 108, as well as any modified electronic versions of the document resulting in adjusted metadata, are stored at a document module, or storage. Storage system 112 may include destination folder 134, and one or more sub folders. Destination folder 134 may store the processed and modified versions of electronic document 108 and modified version of set of electronic documents 110. Sub folder 136 may store the processed and modified versions of electronic document 108 and modified version of set of electronic documents 110 depending on the capacity of destination folder 134 and a threshold of the capacity. Each folder may include its own rules and management functions for the corresponding documents. Both folders are stored in cloud storage 132 of storage system 112.

Figure 2:
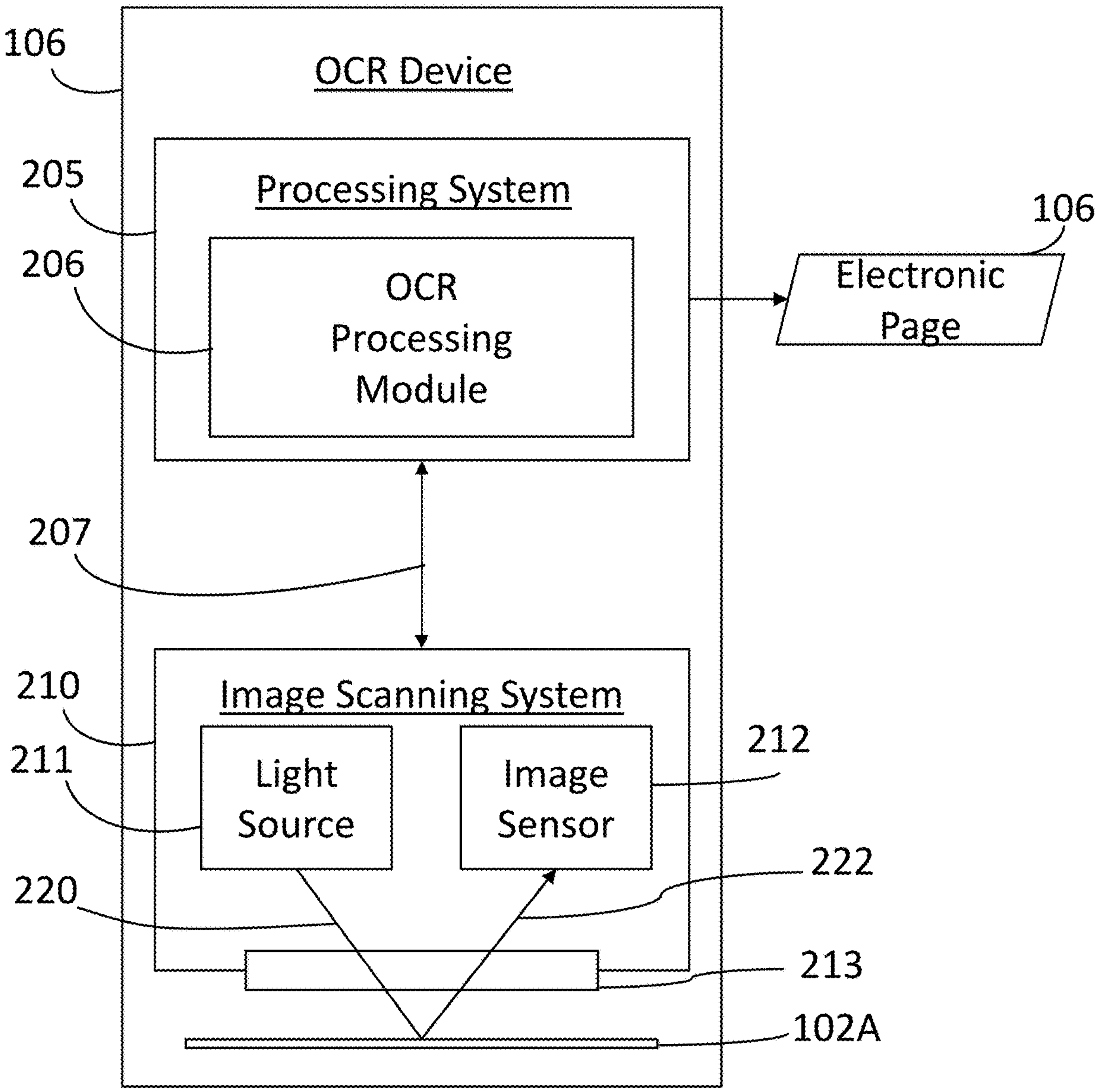
FIG. 2 illustrates an OCR device according to the disclosed embodiments.

FIG. 2 depicts OCR device 106 according to the disclosed embodiments. OCR device 106 receives a page or document 102A of document 102. Further pages may be loaded after processing of page 102A is complete. OCR device 106 includes an image scanning system 210 communicatively coupled to a processing system 205 via a communications link 207. Communications link 207 may be a wire, a communications cable, a wireless link, or a metal track on a printed circuit board.

Image scanning system 210 includes a light source 211 that projects light 220 through a transparent window 213 to strike a surface of page 102A. Page 102A, which may be a sheet of paper containing text or graphics, reflects light 220 towards an image sensor 212. Image sensor 212 contains light sensing elements, such as photodiodes or photocells, converts received light 222 into electrical signals that are transmitted to OCR processing module 206 within processing system 205. The electrical signals may be digital bits.

Processing system 205 generates electronic page 108A from the captured data for page 102A. Electronic page 108A is included in one of the electronic documents within electronic document 108. In some embodiments, OCR device 106 is a slot scanner incorporating a linear array of photocells. OCR processing module 206 that is a part of processing system 205 may be used to operate upon the electrical signals for performing optical character recognition of text and graphics printed on page 102A.

Figure 3:
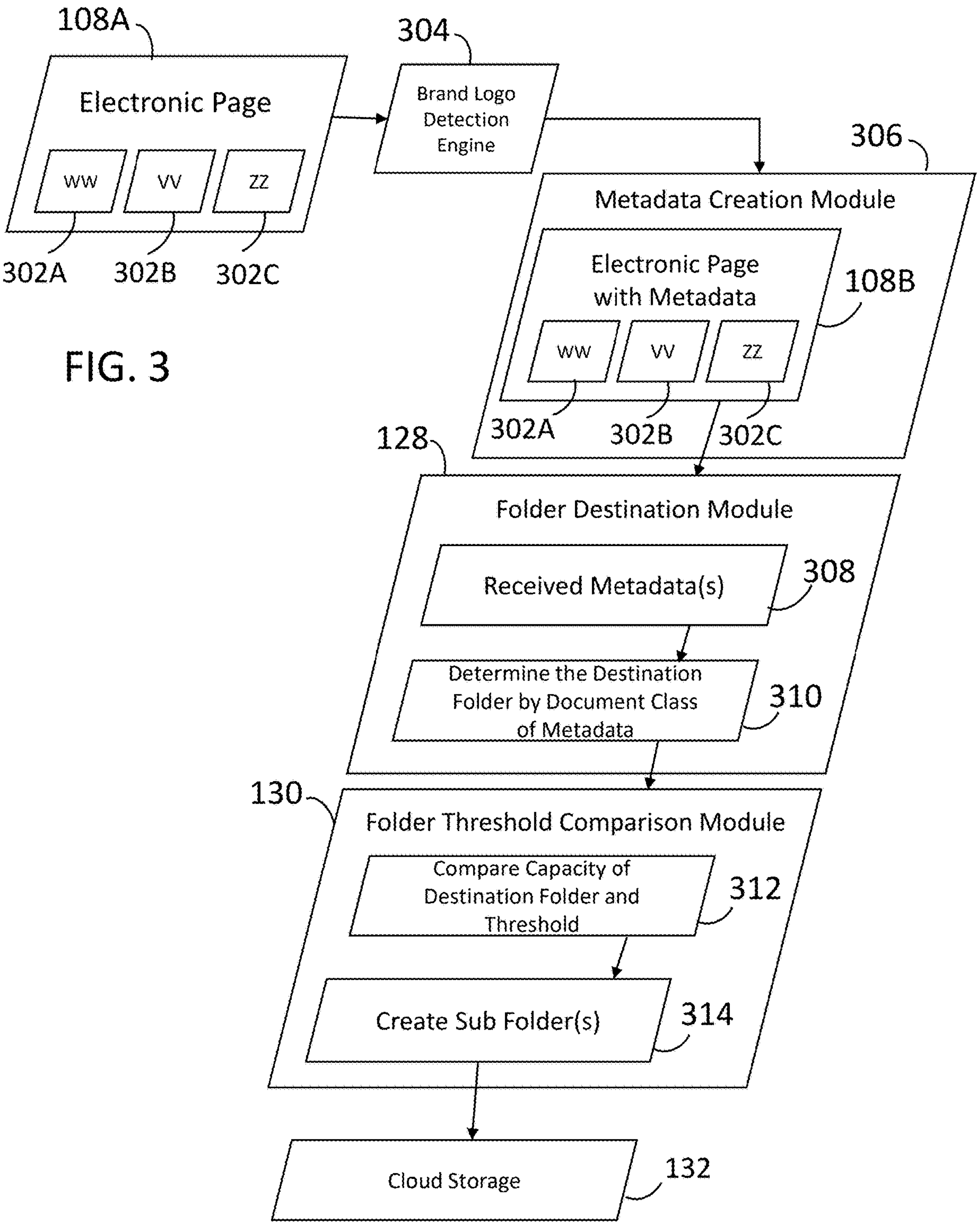
FIG. 3 illustrates a block diagram of data flow of an automatically categorizing a document to a folder when a plurality of brand logos in a document of a plurality of documents according to the disclosed embodiments.

FIG. 3 depicts a block diagram of data flow of an imported original electronic page 108A of an electronic document within folder destination module 128 according to the disclosed embodiments.

Electronic page 108A is received by brand logo detection engine 304 and metadata creation module 306. Metadata creation module 306 adds the brand logo information to a document metadata 116 of the original electronic page 108A and creates electronic page with metadata 108B. Folder destination module 128 receive electronic page 108A with metadata 108B from metadata creation module 306.

Original electronic page 108 include logo field 302A, 302B, and 302C. These may be images and data characters in the electronic page that include company name, brand name, symbol or any combination thereof. For example, logo field 302A may include company name WW, logo field 302B may include brand name VV, and logo field 302C may include symbol ZZ. Of these, company name WW and brand name VV are characters while symbol ZZ are in an image format. Original electronic page 108A is updated to include metadata 116 with document class 118.

After the determination of the destination folder by the document class 118, folder threshold comparison module 130 receives electronic page with metadata 108B. Folder threshold comparison module 130 may be trained to compare the capacity of destination folder 312 and the threshold of the capacity of destination folder. Folder threshold comparison module 130 determines whether the destination folder has sufficient capacity to store electronic page with metadata 108B. When the document size is larger than the threshold, folder threshold comparison module 130 creates sub folder 314. When the document size is smaller than the threshold, folder threshold comparison module 130 will not create sub folder 314. Folder threshold comparison module 130 determines the folder to store electronic page with metadata 108B and store document in cloud storage 132. For example, when the destination folder has 1 TB storage capacity and already 900 GB has been used and the threshold of the capacity is 1000 GB. When a document user wants to store is less than 100 GB, the document is saved in the destination folder. If the document user wants to store is larger than 100 GB, thrashed comparison module 130 creates a subfolder and store the document in the subfolder.

Figure 4:
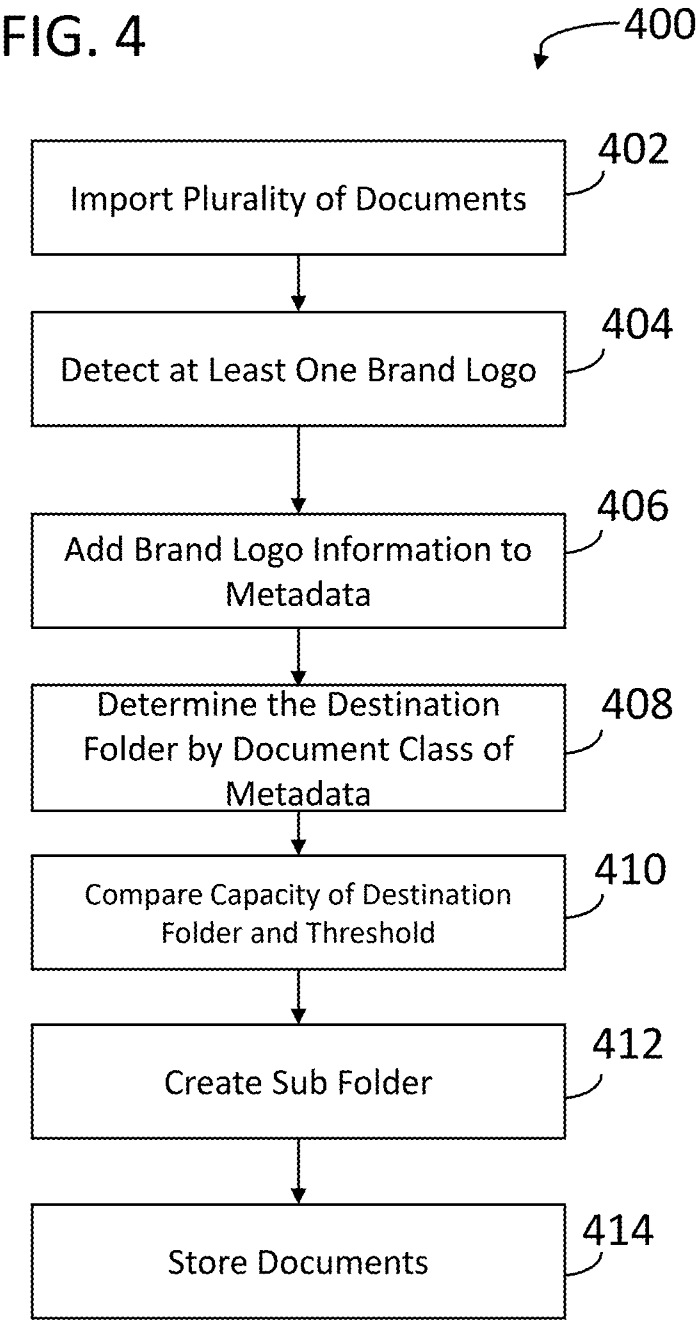
FIG. 4 illustrates a flowchart for the end-to-end system workflow for an automatically categorizing a document with at least one brand logo to a folder according to the disclosed embodiments.

FIG. 4 depicts a flowchart 400 for automatically formatting a date field within a document according to the disclosed embodiments. Flowchart 400 may refer to FIGS. 1-3 for illustrative purposes. Flowchart 400, however, is not limited by the embodiments disclosed by FIGS. 1-3.

Step 402 executes by importing a plurality of documents into storage system 112 using OCR device 106. For example, document 102 may be scanned by OCR device 106 to generate first set of electronic documents 108. A plurality of documents may be scanned to import a large set of documents, such as 100s or 1000s of documents at once.

Step 404 executes by detecting one brand logo within one or more electronic documents of document 108. For example, each page of each document may be analyzed by brand logo detection engine 124, to identify a logo within one or more pages of the document.

Step 406 executes by comparing the brand logo and the look up table within the original electronic document 108. For example, brand logo detection engine 124 may finding the brand logo information, and adding it to the metadata. Step 408 executes by comparing received document class of the metadata to find destination folder 134 for the imported documents. For example, destination folder 134 may be the pre-created within the cloud storage 132 and set by the user, the administrator of the imported documents, and the like.

Step 410 executes by determining whether capacity of destination folder 134 is larger than threshold of destination folder for saving electronic document 108A. For example, if step 410 is larger, then step 412 executes by creating sub folder 136 under destination folder 134. If step 410 is no, then step 414 executes by storing document in destination folder.

Figure 5:
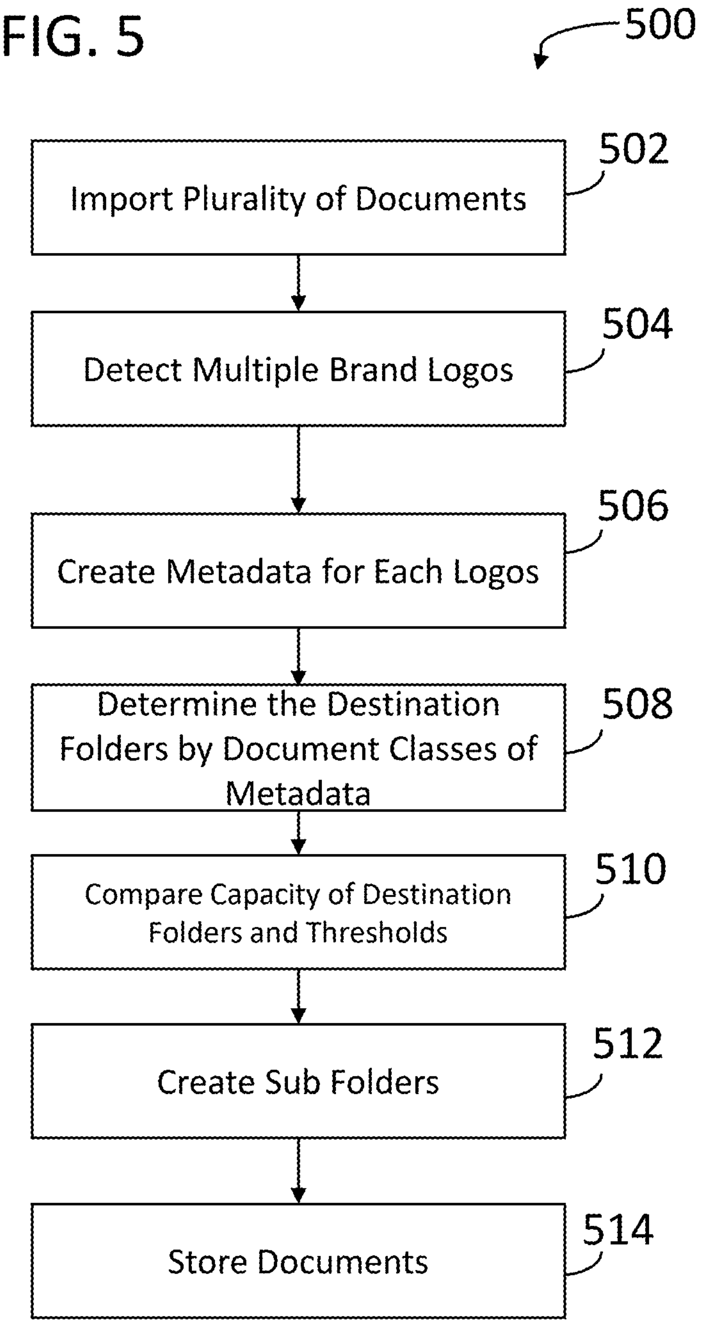
FIG. 5 illustrates a flowchart for the end-to-end system workflow for an automatically categorizing a document with multiple brand logos to a folder according to the disclosed embodiments.

FIG. 5 depicts a flowchart 500 for automatically formatting a date field within a document according to the disclosed embodiments. Flowchart 500 may refer to FIGS. 1-4 for illustrative purposes. Flowchart 500, however, is not limited by the embodiments disclosed by FIGS. 1-4.

Step 502 executes by importing a plurality of documents into storage system 112 using OCR device 106. For example, document 102 may be scanned by OCR device 106 to generate first set of electronic documents 108. A plurality of documents may be done at once to import a large set of documents, such as 100s or 1000s of documents at once.

Step 504 executes by detecting multiple brand logos within one or more electronic documents of document 108. For example, each page of each document may be analyzed by brand logo detection engine 124, to identify logos within one or more pages of the document.

Step 506 executes by creating a received brand logos within the original electronic document 108. For example, brand logo detection engine 124 may determine what format is being used within the identified logos. Step 508 executes by comparing received metadata to find destination folder 134 for the imported documents. Destination folder 134 may be the pre-created within the cloud storage 132 and set by the user, the administrator of the imported documents, and the like.

Step 510 executes by determining whether capacity of destination folder 134 is larger than threshold of destination folder for saving electronic document 108A. For example, if step 510 is larger, then step 512 executes by creating sub folders for each logo 136 under destination folders 134. If step 510 is no, then step 514 executes by storing document in destination folders.

Figure 6:
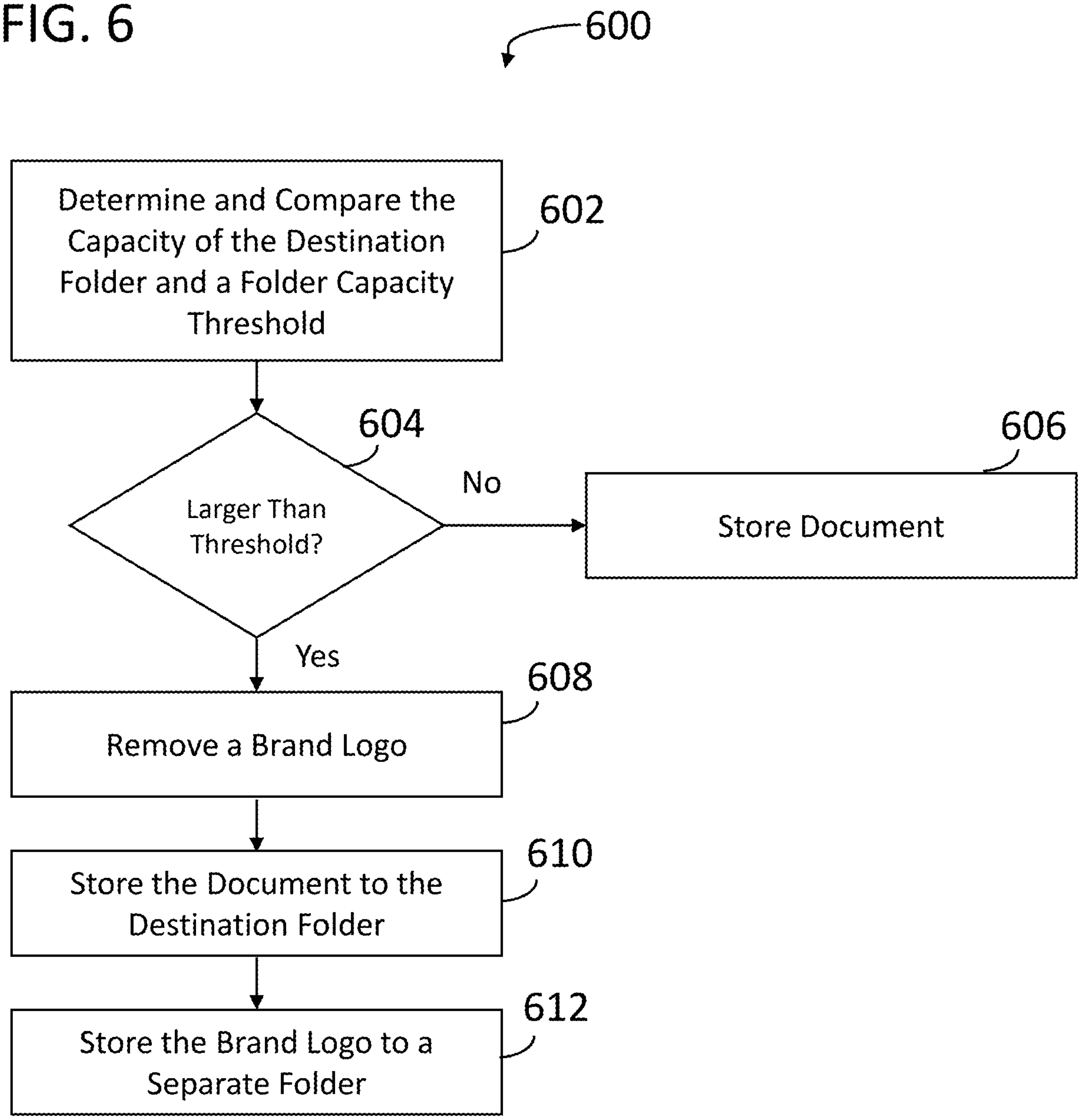
FIG. 6 illustrates a flowchart for the end-to-end system workflow for redesigning data size of a document for storage in a document management system according to the disclosed embodiments.

FIG. 6 depicts a flowchart 600 for automatically formatting a date field within a document according to the disclosed embodiments. Flowchart 600 may refer to FIGS. 1-5 for illustrative purposes. Flowchart 600, however, is not limited by the embodiments disclosed by FIGS. 1-5.

Step 602 executes by determining a capacity of a destination folder 134 and comparing the capacity of the destination folder 134 and a folder capacity threshold. For example, folder threshold comparison module 130 determines whether the destination folder has sufficient capacity to store electronic page with metadata 108B. When the document size is smaller than the threshold, folder threshold comparison module 130 will not create sub folder 314. Folder threshold comparison module 130 determines the folder to store electronic page with metadata 108B and store document in cloud storage 132.

Step 604 executes by determining whether capacity of destination folder 134 is larger than threshold of destination folder for saving electronic document 108A. If step 604 is no, then step 606 executes by storing document in destination folders. For example, when the document size is smaller than the threshold, folder threshold comparison module 130 will not create sub folder 314.

If step 604 is yes, then step 608 executes by removing a logo to reduce document size of the electronic document 108A. Step 610 executes by storing the document to the destination folder. Step 612 executes by storing the brand logo to a separate folder. For example, when the document size is larger than the threshold, removing a logo of the document and storing the document in the destination folder and the removed logo is stored to a separate folder.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for automatically categorizing an electronic document to a folder, the method comprising:
- scanning a plurality of documents using a scanning device to generate a plurality of electronic documents, wherein the plurality of documents is greater than 100;
- uploading the plurality of electronic documents into an upload destination system,
- wherein the electronic document has a file size determined based on the number of pages, and,
- wherein the file size exceeds a storage limit of another system such that the file cannot be stored in the other system;
- detecting at least one brand logo in an electronic document of the plurality of electronic documents;
- comparing the detected at least one brand logo and a brand logo lookup table to find a brand logo information of a corresponding brand logo;
- generating metadata including the identified logo information;
- automatically determining, based on the metadata and a file size of the electronic document, a storage destination for the electronic document;
- adding the brand logo information to an electronic document metadata of the electronic document for folder categorization;
- sending the electronic document to a destination folder based on an electronic document class of the electronic document metadata;
- creating a subfolder for placing the electronic document by the brand logo information of the electronic document metadata in the destination folder; and
- storing the electronic document in the subfolder for corresponding brand logo information in the electronic document metadata, wherein redundant logo data is removed prior to storing to increase storage capacity.

2. The method of claim 1, wherein the brand logo information includes at least one brand name.

3. The method of claim 1, further comprising configuring a folder capacity threshold of the destination folder and determining whether a capacity of the destination folder is above the folder capacity threshold of the destination folder.

4. The method of claim 3, further comprising removing the subfolder and storing the electronic document back into the destination folder when the capacity of the destination folder is below the folder capacity threshold of the destination folder.

5. The method of claim 3, further comprising creating the subfolder for placing the electronic document with the brand logo information of the electronic document metadata in the destination folder, when the capacity of the destination folder is above the folder capacity threshold of the destination folder.

6. The method of claim 1, further comprising storing each of the plurality of electronic documents in each subfolder based on the brand logo information of the electronic document metadata.

7. The method of claim 1, further comprising storing the plurality of electronic documents with the brand logo information of the electronic document metadata in the subfolder for the corresponding brand logo of the at least one brand logo.

8. The method of claim 3, further comprising removing the detected at least one brand logo from each of the plurality of electronic documents prior to storing the electronic document in the destination folder.

9. The method of claim 8, further comprising retrieving the electronic document from the destination folder corresponding to the brand logo.

10. The method of claim 9, further comprising adding the detected at least one brand logo to the electronic document upon retrieval from the destination folder.

11. The method of claim 1, further comprising uploading the plurality of electronic documents including the electronic document through a web client or scanner.

12. A method for automatically categorizing an electronic document to a folder, the method comprising:

scanning a plurality of documents using a scanning device to generate a plurality of electronic documents, wherein the plurality of documents is greater than 100;

uploading the plurality of electronic documents into an upload destination system, wherein the electronic document has a file size determined based on a number of pages, and wherein the file size exceeds a storage limit of another system such that the electronic document cannot be stored in the other system;

detecting a plurality of brand logos in an electronic document of a plurality of electronic documents;

comparing the plurality of detected brand logos and a brand logo lookup table to find a brand logo information of each brand logo of the plurality of brand logos;

determining at least one logo from the plurality of logos based on the identified brand logo information;

adding the identified brand logo information of each brand logo to an electronic document metadata of the electronic document for folder categorization;

sending the electronic document to a destination folder based on an electronic document class of the electronic document metadata;

creating a plurality of subfolders for placing the electronic document by the brand logo information of each brand logo of the electronic document metadata in the destination folder; and storing the electronic document in the plurality of subfolders for the corresponding brand logo information of each brand logo of electronic document metadata.

13. The method of claim 12, further comprising configuring the folder capacity threshold of the destination folder and determining whether a capacity of the destination folder is above the folder capacity threshold of the destination folder.

14. The method of claim 13, further comprising removing the multiple subfolders and storing the electronic document back into the destination folder when the capacity of the destination folder is below the folder capacity threshold of the destination folder.

15. The method of claim 12, wherein the brand logo information includes at least one brand name.

16. The method of claim 12, further comprising, counting the number of appearances of the logo and determining the most appeared logo and creating subfolder for the logo by looking up in the look up table when a plurality of brand logos are detected in an electronic document.

17. A method for redesigning data size of an electronic document for storage in an electronic document management system, the method comprising:

scanning a plurality of documents using a scanning device to generate a plurality of electronic documents, wherein the plurality of documents is greater than 100;

uploading the plurality of electronic documents into an upload destination system, wherein the electronic document has a file size determined based on a number of pages, and wherein the file size exceeds a storage limit of another system such that the electronic document cannot be stored in the other system;

determining a capacity of a destination folder within the electronic document management system;

comparing the capacity of the destination folder against a folder capacity threshold;

removing a brand logo within an electronic document assigned to the destination folder based on the comparison, wherein the brand logo matches a brand logo in a brand logo lookup table for the electronic document management system, thereby reducing a data size of the electronic document;

storing the electronic document to the destination folder; and storing the brand logo in a separate folder for restoring the electronic document.

18. The method of claim 17, further comprising determining that the capacity of the destination folder exceeds the folder capacity threshold.

19. The method of claim 17, further comprising configuring the folder capacity threshold within the electronic document management system.

20. The method of claim 17, further comprising storing the electronic document with the brand logo in the destination folder if the capacity for the destination folder does not exceed the folder capacity threshold.

* * * * *